United States Patent [19]

McDonald

[11] 4,275,830
[45] Jun. 30, 1981

[54] SECURITY SCRAP STORAGE CONTAINER OR BIN

[76] Inventor: Richard J. McDonald, 17A Jayne Ave., Melville, N.Y. 11747

[21] Appl. No.: 93,148

[22] Filed: Nov. 9, 1979

[51] Int. Cl.³ .............................................. B65F 1/00
[52] U.S. Cl. ................................... 232/43.1; 248/139
[58] Field of Search ....................... 232/43.1, 43.2, 44, 232/45; 248/134, 143, 139

[56] References Cited

U.S. PATENT DOCUMENTS

| | | | |
|---|---|---|---|
| 540,530 | 6/1895 | Willson | 248/139 X |
| 1,364,126 | 1/1921 | Martel | 232/45 |
| 2,801,085 | 7/1957 | Maxon | 248/139 X |
| 3,141,609 | 7/1964 | Roth | 232/43.1 |
| 3,198,395 | 8/1965 | McKinney | 248/139 X |
| 3,854,656 | 12/1974 | Bishop et al. | 232/1 R |
| 3,981,436 | 9/1976 | Neal | 232/43.2 |

Primary Examiner—Francis K. Zugel
Attorney, Agent, or Firm—Brooks, Haidt, Haffner & Delahunty

[57] ABSTRACT

Large tiltable and transportable storage container or bin in which valuable scrap material, such as scrap lengths of copper cable, is deposited has a "one-way" deposit opening on its top which is closed by a hinged cover and hood which obstruct access to the interior of the bin in the open, closed, and all intermediate positions of the cover. Scrap lengths of copper cable are placed on the cover when in its open position, and are deposited by upending the cover to its closed position. Deposit opening, cover and hood have particular size and location on a top plate of the bin, to facilitate loading. Top area of bin also includes an unloading opening, preferably of particular extent, which is closed by a lockable cover.

5 Claims, 3 Drawing Figures

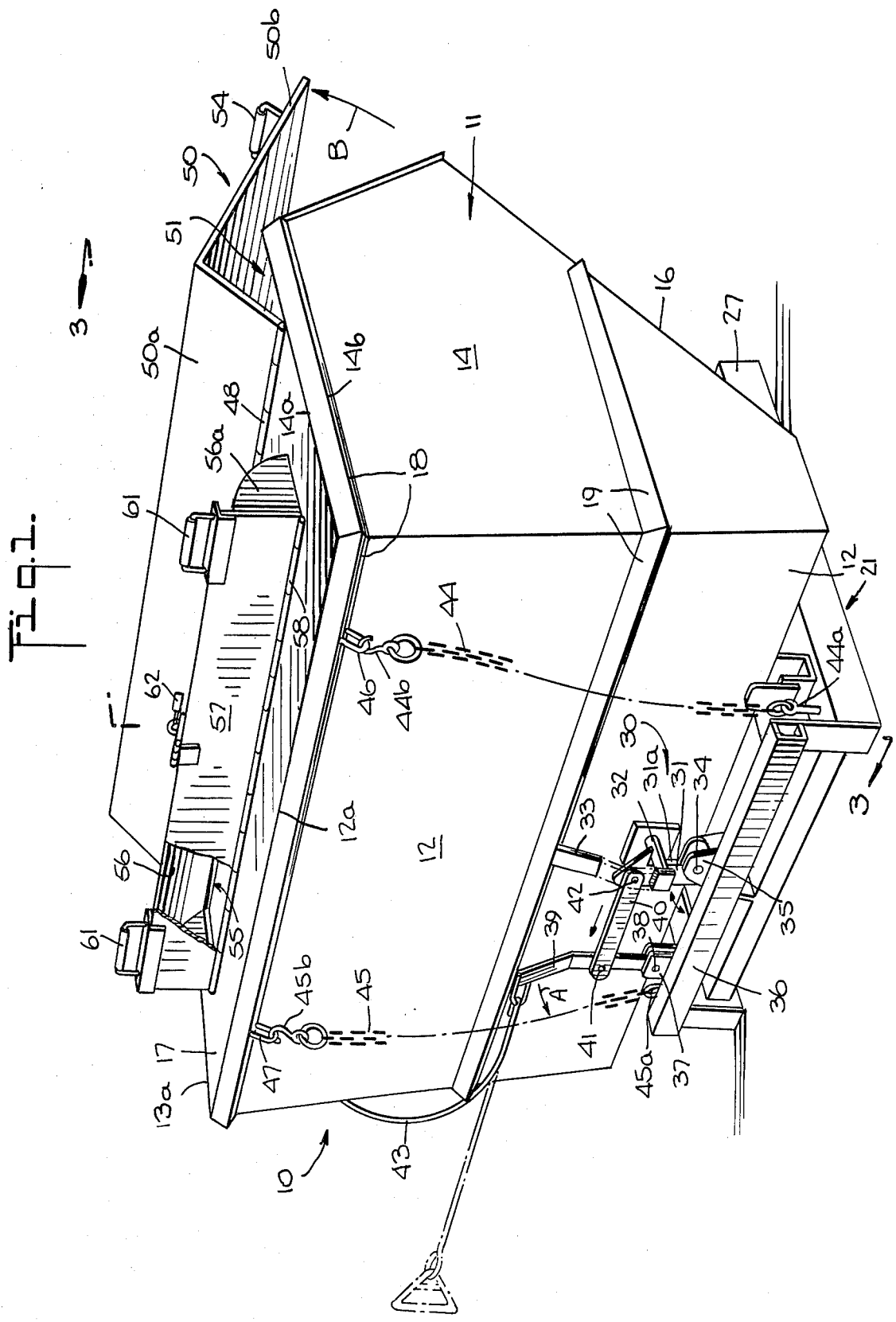

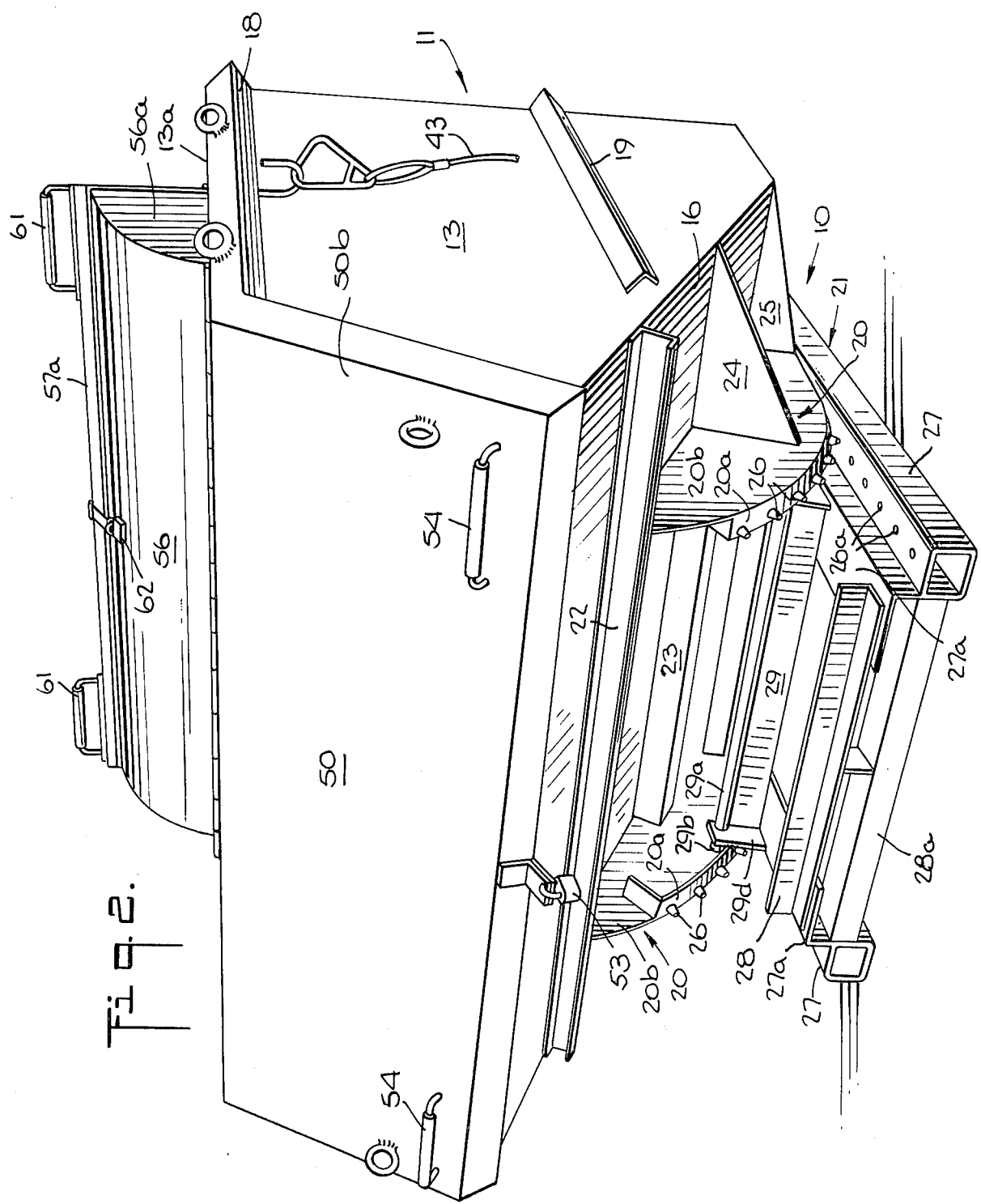

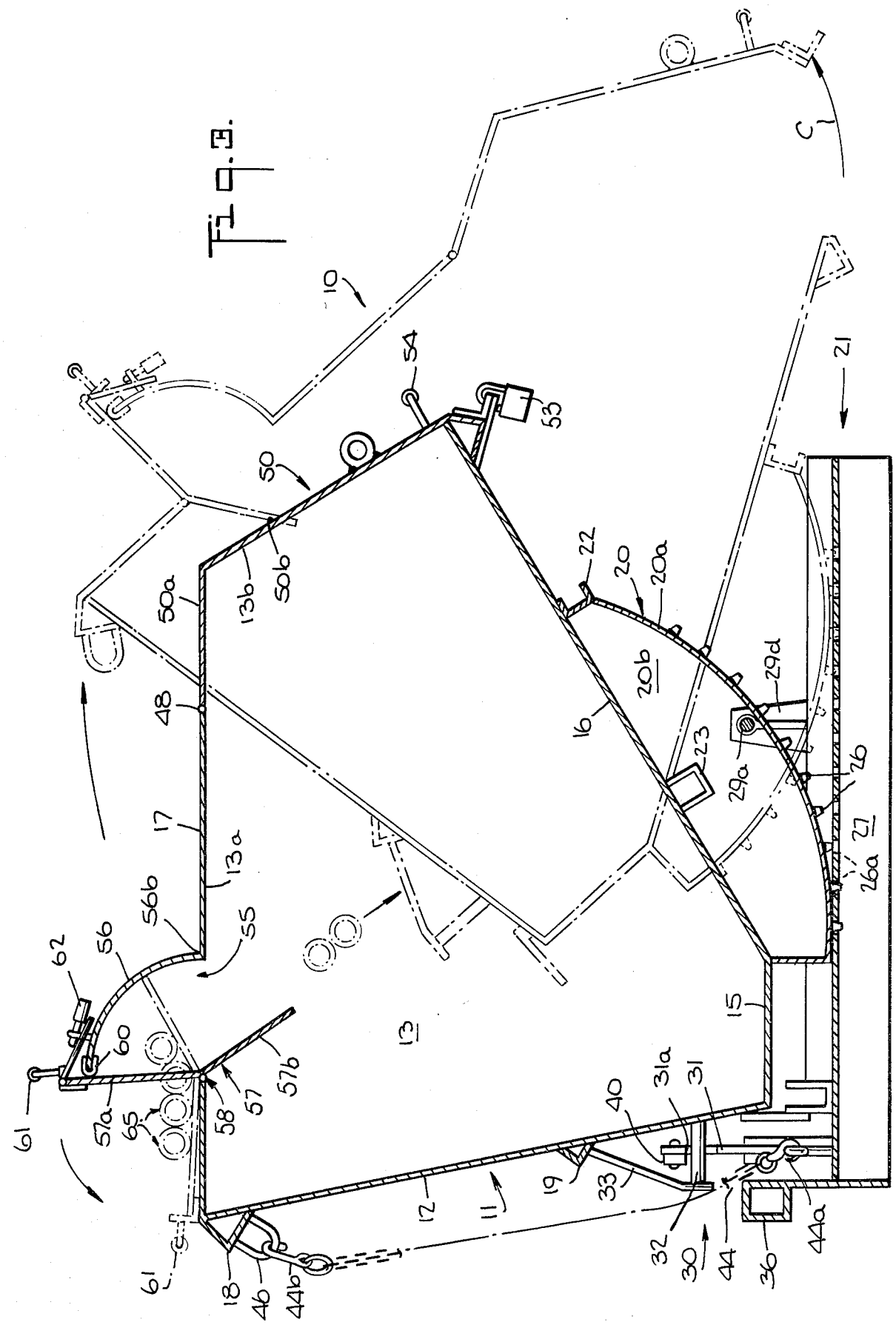

SECURITY SCRAP STORAGE CONTAINER OR BIN

FIELD OF INVENTION

This invention relates to security devices which inhibit theft of materials, and more particularly to large, tiltable containers or bins for accumulating and temporarily storing relatively valuable materials, such as scrap copper, which incorporates such security features.

Although the invention may have other uses, it was made while attempting to resolve a prevailing security and trucking problem involved in collecting at the end of each day and temporarily storing pieces of copper cable scrap as it accumulates while, for example, public electric utility work crews are in the field installing heavy copper cable such as EHV (extra-high voltage) underground electric transmission line cable. It will therefore be described in connection with such use.

BACKGROUND AND OBJECTS OF THE INVENTION

As the installation of such heavy transmission lines proceeds, relatively short-length scraps of the copper cable accumulate when the cable is cut to length, lines are spliced, etc. Considering the current value of relatively pure scrap copper is about $1.00 per pound, these short but heavy scrap lengths of cable are very valuable and must be salvaged. They are relatively easy to carry, and copper scrap dealers are always conveniently available. Accordingly, for salvage purposes it is necessary to provide a temporary storage bin in which small quantities of such scrap copper material can be deposited from time to time for temporary accumulation under conditions which will prevent pilfering of the stored material, and such is an object of the invention.

After accumulation, the scrap cable must be hauled to a central location where the insulation is peeled or stripped from the conductor metal to render the scrap copper relatively pure for sale. In the past, and because of its high value, the copper cable scrap was throwloaded on to trucks or into bins at the various job sites each day, and hauled to a central yard facility for further temporary storage pending such processing for sale. Thus, not only is it an object of the invention to safeguard the valuable scrap from pilferage both at the job site and at the central yard location, but it is also an object to facilitate the transporting of the scrap from the job site to the point of central storage and processing.

Further, the invention is intended to provide a means for maintaining good housekeeping at such locations, by providing a neat-appearing, convenient and transportable, as well as secure, temporary storage container or bin for scrap materials.

BRIEF DESCRIPTION OF THE INVENTION

Briefly describing the invention, a large tiltable storage bin or container of welded steel construction, which can be lifted using a common fork-lift truck and conveniently transported by truck, is provided with a novel top having a convenient "one-way" deposit opening for deposit of scrap material in the bin, and a lockable unloading opening. The deposit opening has a hinged cover including a hood which blocks access to the interior of the bin whether the cover is in its open, closed, or any intermediate position, so that materials can only be deposited, and never remove from the bin therethrough. A lockable hinged cover covers the second top opening, which is the unloading opening through which the bin contents are conveniently removed by dumping or otherwise. In its preferred embodiment, the storage container is an ordinary, so-called dumpster which has been modified by addition of the novel one-way deposit opening and the novel unloading opening and lockable cover.

The deposit opening is preferably formed by an elongated slot through a welded-on top plate of the bin, which is parallel to, and at a location spaced inwardly from the front wall of the bin, the slot opening having convenient width, and length such that its ends are spaced away from the side walls of the bin as will be seen, all to facilitate the deposit of scrap lengths of large diameter heavy cable such as has been described. The slot opening is closed by an angular drop chute and hood which extends the full length of the opening. The drop chute provides the cover for the deposit opening, and is pivoted on a hinge which extends along, and connects the base of the chute angle with a side edge of the deposit opening. The chute portions on either side of the hinge preferably have an included angle of 135° facing upwardly, in the direction of the exterior of the storage bin, so that, together with the hood, the angular chute cover obstructs access to the bin interior via the opening, whether the cover is in its open, closed, or any intermediate position. Preferably, it is normally open to conveniently receive materials placed thereon, whereupon the chute cover is upended to its closed position to deposit the material in the bin.

The bin unloading opening extends from the rearward edge of the welded-on top plate to the rear wall of the bin, and fully across the width of the bin. At an intermediate location between the top plate edge and the rear wall, the upwardly facing plane of the opening cants downwardly, as does the single unloading cover which covers all of the open area, thus to improve the convenience with which such cable scrap may be dumped or otherwise unloaded.

It will be seen that scrap materials once deposited in the bin through the one-way opening cannot be removed, except via the unloading opening which is closed by a lockable cover which is hinged along its forwardmost edge. The scrap cannot be removed until the cover of the unloading opening is unlocked and opened, usually at a scrap-processing location to which the scrap container is hauled by truck. Removal of the scrap is facilitated by tiliting the bin body on the base frame on which it is mounted. The base frame is also adapted to be engaged by the forks of a conventional fork lift truck so that the bin can be lifted and transported.

The invention therefore provides a secure way to store valuable scrap material until it can be sorted and sold, and permits better housekeeping at job sites.

DETAILED DESCRIPTION OF PREFERRED EMBODIMENTS

These and other objects, features and advantages of the invention will be readily apparent from the following description of preferred embodiments, in which reference is made to the accompanying drawings.

FIG. 1 is a perspective showing of a scrap bin in accordance with the invention, as generally seen from the front of the bin, a portion being broken away to facilitate description;

FIG. 2 is a similar perspective showing of the bin of FIG. 1, as seen generally from the rear of the bin; and FIG. 3 is a sectional side elevation of the bin as seen from lines 3—3 in FIG. 1.

Referring first to FIG. 1, a scrap bin or container in accordance with the invention is generally indicated by reference numeral 10. The body 11 of the bin is formed by a generally vertical front wall 12, a pair of side walls 13, 14, a horizontal bottom wall 15, and an upwardly slanted rear wall 16, the angle of the latter providing clearance for tilting of the container body 11 as will be seen. Body 11 further includes a top plate 17 which extends between and is attached as by welding to the upper horizontal edge portions 13a, 14a of the side walls 13, 14 and along the upper edge 12a of the front wall 12. Horizontally extending bumpers 18 and 19, made of inverted angle iron or the like, extend at least part way around the front and side walls as shown, and serve as stiffeners for the expanses of steel plate from which the walls are made.

Referring to FIGS. 2 and 3, the bin body 11 further mounts a pair of arcuate tilt-legs 20 by which the body rests on a base frame which is generally indicated by reference numeral 21. The tilt-legs 20 are attached, as by welding, to the rear wall 16, and extend in the forward and rearward direction of the body in spaced-apart relation in the direction of the body width, as shown. The rear wall 16 is suitably stiffened by laterally extending channel irons 22 and 23, and the tilt-legs 20 are suitably braced by upstanding steel plates 24, 25, all of which are attached to the rear wall 16 and to the tilt-legs 20, as by welding.

The tilt-legs 20 themselves are formed from downwardly facing frontwardly and rearwardly extending flat iron pieces 20a which are arcuately shaped and welded along their respective side edges to the correspondingly arcuately-shaped underside edges of the vertical plate portions 20b of the legs, to project inwardly as shown. Aligned and radially outward projecting steel pegs 26 are attached in arcuately spaced relation to the underside surfaces of the flat iron pieces 20a to mesh, in tine-like fashion, in respective aligned peg apertures 26a which are correspondingly spaced apart and formed in the forwardly and rearwardly oriented box-beams 27 of the base frame 21, as shown.

The laterally spaced apart box beams 27 include respective upwardly and inwardly directed portions 27a to which are mounted the cross beams 28, 28a and 29 of the base frame 21. The cross beam 29 mounts a cross bar 29a whose ends 29b respectively project outwardly beyond the vertical plates 29d at the ends of the beam and are disposed immediately above the tilt-leg flat plates 20a to be engaged by the latter only if the body tends to lift off the base frame 21 during tilting, thus to prevent the pegs 26 of body 11 from disengaging the peg apertures 26a in the base frame.

The spacing of the box beams 27 and the arrangement of the cross beams 28, 29, and 28a (which is spaced below the beam 28) adapts the base frame 21 to be engagable by the forks of a conventional fork-lift truck so that the entire container 10 can be lifted and moved, or placed on a truck for hauling to a different location.

A latch mechanism, generally indicated by reference numeral 30, connects the front wall 12 of the bin to the base frame 21 when the body 11 is to be retained in its upright position as shown in the Figures of the drawings. The latch mechanism 30 includes a laterally pivotable vertical latch member 31 which is notched, as at 31a, to engage a forwardly projecting engagement bar or rod 32 on the bin body 11 which is attached as by welding to the front wall 12 and stiffened by a stiffening bar 33. The latch member 31 pivots about its lower end on the pivot pin 34 which is attached to an upstanding pin mount 35 welded on to the base frame behind the cross beam 36. A similar upstanding pin mount 37 is also attached to the cross beam 36 at a laterally spaced location, as shown, from the pin mount 35, its pin 38 providing the pivot location at the lower end of a vertical latch release bar 39 whose pivoting in counterclockwise direction as shown by arrow A in FIG. 1 will pull the horizontal latch release arm 40 in the same direction to disengage the notch 31a of the latch release member 31 from the body rod 32. As will be understood from FIG. 1, the arm 40 is pivotally mounted by pins 41, 42 at each of its ends respectively to a middle location on the vertical release bar 39 and an upper end location on the vertical latch release member 31. A manual pull-cable 43 is attached to the upper end of the bar 39 as shown, to effect the required pivotal releasing movement of the latter when the body 11 is to be tilted.

Such releasing of the latch 31 from the body bar 32 permits the body 11 to tilt downwardly in the rearward direction by gravity, as indicated by the dotted line showing in FIG. 3, the body being guided in its movement by the arcuate tilt legs 20 whose pegs 26 successively engage their associated base frame apertures 26a. As a safety precaution, a pair of vertical chains 44, 45, which are attached at their lower ends 44a, 45a to the base frame 21, are hooked at their upper ends 44b, 45b to the pair of hookeyes 46, 47 which are welded on to the front wall bumper 18 of the body 11, as shown. Thus, should the latch member 31 be accidentally released, the chains 44, 45 will prevent tilting of the container body 11, the chains having appropriate length for the purpose. Of course, the chains 44, 45 must be manually unhooked when dumping of the container is intended.

Returning to the description of the container body 11, its fixed top plate 17, which is welded on three sides as previously mentioned, extends rearwardly from the pin body front edge 12a to a location beyond the midpoint of the horizontal edge portion 13a, 14a of the sidewall upper edges, e.g., to a location about two-thirds (⅔) of the distance across the horizontal upper edge portions, as seen in FIGS. 1 and 3. The container top 17 has a hinge 48 along its otherwise free rearward edge, to which an angular-shaped top unloading cover 50 is hinged for vertical opening movement, as illustrated by arrow B in FIG. 1. The cover 50 which includes a horizontal top plate portion 50a and an angulated top plate portion 50b in fixed relation at an included angle of 120° with respect to each other, covers the remaining portion of the top opening area generally defined by the horizontal sidewall edge portions 13a, 14a and the diagonal edge portions 13b, 14b which have similar 120° angular relation with each other, respectively. These remaining portions of the top area of the bin together form the top unloading opening 51 of the container.

When the container is tilted downwardly as previously described, the cover 50, which is normally locked to the rear wall 16 by a padlock arrangement 53 (FIG. 2), is unlocked and then opened by pivoting in the direction of arrow C in FIG. 3 to permit the contents of the bin 10 to be unloaded. The cover 50 has handles 54 for convenient lifting.

Valuable scrap materials, such as scrap lengths of copper cable, are deposited in the bin through an elongated rectangular deposit opening 55 formed in the top 17, as best seen in FIG. 1. The opening 55 extends parallel to, but is spaced away from the front wall upper edge 12a a distance of about 10", which is substantially equal to the width of the opening 55 itself. The length of the opening 55 can be substantially equal to the width of the body 11 between its sidewalls 13, 14, but is preferably somewhat shorter as shown, to facilitate deposit of the cable scraps which might "hang-up" in the bin just below the opening 55, if the cable lengths are slightly oversized as compared with the opening 55. A shorter length deposit opening will only accomodate a slightly longer cable for deposit, and the cable will therefore always clear the sidewalls 13, 14 and drop to the bottom of the bin if the deposit opening 55 is about one-foot shorter than the container body width, i.e., its ends being respectively spaced inwardly about 6" from each of the sidewalls 13 and 14.

Access to the interior of the bin body 11 through the deposit opening 55 is prevented by an upwardly projecting, guadrantly curved hood 56 which is disposed thereover as shown, and the pivotable cover 57. The height of the hood 56 is about the same as the width of the opening 55, and the hood is circularly curved having vertical end plates 56a which close the ends of the hood and are attached as by welding to the body top plate 17 adjacent to the respective ends of the opening 55. The lower edge 56b of the hood 56 is similarly welded to the top plate 17 adjacent to the rearwardmost edge of the opening 55, as will be understood from the drawings. Hood 56 provides a bin deposit area facing towards the front wall 12 of the bin body, as shown.

The chute-like angular cover 57 is hinged along the forewardmost elongated edge of the opening 55, as by the elongated hinge 58. As best understood from FIG. 3, the cover plate portions 57a and 57b, which are attached in fixed relation on opposite sides of the hinge 58 to thereby form the chute 57, are preferably disposed at an included angle of 135° facing in the upward, or outward direction of the bin. The plate portion 57b spans across and conceals the opening 55 when cover 57 is in its open position, and the height of the plate portion 57a when the cover is in its closed position is greater than that of the hood 56 as seen in FIG. 1 or FIG. 3, so that the hood provides a stop for the cover portion 57a, which closes the forward facing deposit area when the cover 57 is in its closed position. Of course, when the cover 57 is in its fully open position, the cover plate portion 57a abuts against the top plate 17 of the container body 11, as shown in dotted lines in FIG. 3, which thus provides a stop for the cover 57 in its opened position.

Further, a soft rubber or plastic edging 60 is attached along the upper, free edge of the hood 56 to afford some protection for workers' hands and fingers should the cover accidentally close on them, and to afford noise reduction in normal operation. The cover 57 has a pair of handles 61, attached to the coverplate portion 57a as shown, for convenient use of the deposit chute, and it will be noted that these handles 61 project outwardly away from the upper edge 12a of the front wall 12 when the cover is opened, thus to further protect the hands and fingers of workers using the bin. The cover 57 may, by counterweighting, be normally disposed in either its open or its closed position, but is preferably disposed in its open position ready for deposit use at all times.

Referring to FIG. 3, when scrap copper cable as indicated by dotted lines 65 is to be deposited into the bin, the cable is placed on the cover 57 while in its opened position, as seen. The cover 57 is then lifted using its handles 61 and pivoted about the hinge connection 58 to deposit the scrap through the opening 55 as the chuteplate portion 57b moves correspondingly downward to open the opening 55. The cover 57 may then be returned to its open position to receive more scrap.

It will be noted that the deposit opening 55 is thus a "one-way" opening, because the shape of the chute-like cover 57 together with the hood 56 prevents access through the opening to the bin interior when the cover 57 is in its opened, closed or intermediate positions. Pilfering from the bin through the opening 55 is thereby prevented. The limited quantities of cable scrap which may be deposited with each operation of the chute cover facilitates orderly dropping of the scrap into the bin, resulting in comparatively compact storage therein.

A padlock arrangement 62 may be included for locking the cover 57 against the hood 56 in its closed position, to indicate times when the bin is not to be used for the deposit of scrap, such as when it is full, or is being reserved for particular types of materials. As previously noted the deposit opening need not be locked for any purpose of preventing access to the interior of the bin. So long as the unloading cover 50 is closed and locked by padlock 53, access to the bin interior is prevented.

Thus has been described a transportable and tiltabe security storage container for valuable scrap material which achieves all of the objects of the invention.

What is claimed is:

1. In a tiltable storage bin adapted to receive and store scrap lengths of copper cable or like materials and having a bin body including a front wall, a back wall, and respective side walls whose upper edges together define a top area of the bin body, and a bottom wall, and a base frame on which said bin body is mounted for tilting movement for unloading the bin body, the improvement comprising a top plate extending between and attached to said side wall upper edges and to said front wall upper edge leaving an open unloading portion of said bin body top area adjacent to said back wall and extending between said side walls, said top plate having means defining an elongated deposit opening therethrough and extending substantially parallel to said bin body front wall for depositing materials in said bin body, said deposit opening having respective parallel front and rear edges and end edges extending therebetween, each of said front and end edges of said deposit opening being spaced inwardly a distance away from its associated bin body wall, an upstanding security deposit cover hood attached to said top plate adjacent to said rear edge of the deposit opening and including vertical end plate portions attached to said top plate respectively adjacent to said end edges of the deposit opening, said hood projecting upwardly from said top plate and forwardly in the direction of said front edge of the deposit opening to present a bin deposit area facing substantially towards said front wall of the bin body, a pivotable security deposit cover having hinge means connecting the cover to and along the length of said front edge of said deposit opening for movement between an open position and a closed position of the cover, said cover comprising a first plate portion extending from said cover hinge substantially the width of said deposit opening to said hood for closing said deposit opening when said cover is in its open position, and a second plate portion extending from said cover hinge in direction towards said front wall of the bin body and lying substantially adjacent to said top plate for receiving said materials when said cover is in its said open position and having size to close said bin deposit area provided by said hood when said cover is in its closed position, said cover plate portions being disposed with respect to each other whereby, when said cover is pivoted on said hinge to its said closed position, said cover plate portions are disposed to drop said materials thereon into said bin body, said cover plate portions further being disposed with respect to each other and with respect to said hood to obstruct access by the hand to the interior of said bin body via said deposit opening when said security deposit cover is in both of its said open and closed positions and in all intermediate positions of said cover, and an openable unloading cover covering said open top area portion of said bin body and having lock means for locking said unloading cover in a closed position thereof covering said open top area portion, said upper edges of said bin body side walls having respective horizontal edge portions extending outwardly from said front wall upper edge, and respective diagonal edge portions extending downwardly and rearwardly from the respective of said horizontal edge portions to said rear wall of the bin body, said top plate extending rearwardly of said hood, and said unloading cover having a forward edge having hinge means hingedly attaching the cover on and along the length of said top plate rearward edge, said unloading cover extending downwardly and rearwardly to said rear wall of the bin body and between said respective diagonal edge portions of said bin body side walls when the cover is in its closed position.

2. The improvement according to claim 1, wherein said first and second plate portions of said security deposit cover are disposed at a fixed included angle of substantially 135° with respect to each other facing in the upward direction of said bin body.

3. The improvement according to claim 2, wherein said front edge of said deposit opening is spaced away from said bin body front wall a distance substantially equal to the height of projection of said hood above said top plate.

4. The improvement according to claim 1 which further comprises lock means on said hood and said deposit cover for locking said deposit cover in its said closed position.

5. The improvement according to claim 1, wherein said top plate rearward edge is located at an intermediate location along, and beyond the midpoints of, the lengths of said respective side wall horizontal edge portions, said unloading cover having a horizontal portion including said forward edge, and an angular portion extending downwardly and rearwardly from said horizontal portion, said portions of the unloading cover having size and fixed angular disposition with respect to each other whereby said cover conforms to the shape of said open unloading portion of the bin body top area when the cover is in its closed position.

* * * * *